US009707640B2

(12) United States Patent
Bour (10) Patent No.: US 9,707,640 B2
(45) Date of Patent: Jul. 18, 2017

(54) VIBRATION DAMPENING DEVICE FOR THE MANUFACTURE OF A ROTOR

(71) Applicant: SNECMA, Paris (FR)

(72) Inventor: Jean-Luc Bour, Guyancourt (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/098,721

(22) Filed: Dec. 6, 2013

(65) Prior Publication Data

US 2014/0158750 A1 Jun. 12, 2014

(30) Foreign Application Priority Data

Dec. 6, 2012 (FR) ...................................... 12 61705

(51) Int. Cl.
| | | |
|---|---|---|
| *B23K 37/00* | (2006.01) | |
| *B23K 5/22* | (2006.01) | |
| *B23K 20/12* | (2006.01) | |
| *B23K 37/053* | (2006.01) | |
| *B23K 37/04* | (2006.01) | |
| *B23K 101/00* | (2006.01) | |

(52) U.S. Cl.
CPC .......... *B23K 20/122* (2013.01); *B23K 20/129* (2013.01); *B23K 37/04* (2013.01); *B23K 37/0531* (2013.01); *B23K 2201/001* (2013.01)

(58) Field of Classification Search
CPC .... B23K 20/129; B23K 20/12; B23K 9/0354; B23K 37/0531
USPC .................................. 228/212, 211, 44.5, 48
See application file for complete search history.

(56) References Cited

U.S. PATENT DOCUMENTS

| | | | | |
|---|---|---|---|---|
| 2,426,746 A | * | 9/1947 | Price .................... | B23K 11/002 219/101 |
| 2,637,521 A | * | 5/1953 | Constantine et al. .... | 416/244 R |
| 3,488,830 A | * | 1/1970 | Miller .......................... | 228/178 |
| 3,734,387 A | * | 5/1973 | Sannipoli ....................... | 228/6.1 |
| 4,033,501 A | * | 7/1977 | Ambrose et al. .............. | 228/2.3 |
| 4,086,690 A | * | 5/1978 | Bernasconi .................. | 29/889.2 |
| 4,567,649 A | * | 2/1986 | Ades et al. .................... | 29/800 |
| 4,605,151 A | | 8/1986 | Brown | |
| 4,628,575 A | * | 12/1986 | Klufas et al. ................ | 29/889.2 |
| 4,884,611 A | * | 12/1989 | Schmidt .................. | B60B 30/06 157/1.17 |
| 5,414,929 A | * | 5/1995 | Floser et al. ............... | 29/889.21 |

(Continued)

FOREIGN PATENT DOCUMENTS

| | | |
|---|---|---|
| FR | 2 848 132 A1 | 6/2004 |
| GB | 2 161 732 A | 1/1986 |

OTHER PUBLICATIONS

French Search Report issued Aug. 21, 2013 in Patent Application No. 1261705 with English Translation of Category of Cited Documents.

*Primary Examiner* — Erin Saad
*Assistant Examiner* — Carlos Gamino
(74) *Attorney, Agent, or Firm* — Oblon, McClelland, Maier & Neustadt, L.L.P.

(57) ABSTRACT

A vibration dampening device for the manufacture by rotational friction welding of a turbomachine rotor including a first disc and a second disc each having a hub with an internal surface is provided. The device includes a first clamping device configured to be positioned coaxially to the hub of the first disc and having a pair of radially opposite jaws suited to come into contact with the internal surface of the hub of the first disc.

10 Claims, 4 Drawing Sheets

(56) References Cited

U.S. PATENT DOCUMENTS

| | | | |
|---|---|---|---|
| 6,311,589 B1* | 11/2001 | Schmitt | 81/426 |
| 7,201,204 B2* | 4/2007 | Corghi | B60C 25/0545 |
| | | | 157/16 |
| 2004/0108358 A1 | 6/2004 | Carrier et al. | |
| 2006/0255099 A1* | 11/2006 | Balbach et al. | 228/114.5 |
| 2010/0172761 A1* | 7/2010 | Le Goff | 416/198 A |
| 2012/0299233 A1* | 11/2012 | Header | 269/91 |

* cited by examiner

VIBRATION DAMPENING DEVICE FOR THE MANUFACTURE OF A ROTOR

FIELD OF THE INVENTION

This invention relates to a method for assembling the discs of a rotor of a turbomachine by rotational friction welding and a vibration dampening device for hubs of discs during their assembly via this method.

TECHNOLOGY BACKGROUND

A compressor, in particular high pressure, comprises one or several rotating discs (rotor), vaned or not and one or several fixed impellers (rectifier stages).

A turbine, in particular high pressure, comprises several rotating discs (rotor), vaned or not, and one or several fixed impellers (nozzle stages).

The rotating discs generally include peripheral grooves wherein vanes are nested, or are carried out in a single piece with the vanes, which are then machined on the periphery of the discs (the discs of this type are called integrally vaned discs).

The different discs can be assembled coaxially by bolting, by electron beam welding or, by rotational, inertial or pilot friction welding.

The welding via rotational friction consists in strongly pushing a disc fixed in rotation against another disc that is rotating around its axis and which is fixed in translation, by applying on these discs a force according to an axis corresponding to their main revolution axis. The friction of the surfaces of the discs in contact releases a large quantity of heat which raises the temperature of these surfaces in contact and allows them to be assembled by welding thanks to the plastic deformation of the materials of the discs.

This type of welding has the advantage of hardly altering the mechanical properties of the materials and of being able to be executed rapidly. However, it generates high-frequency and high-intensity vibrations, which can favour the formation of cracks due to fatigue with a large number of cycles, in particular on thin zones as well as in the hubs of these discs.

It has been proposed to dampen the vibrations in an axial plane of the hubs of the discs using steel expansion rings with a generally conical section, and which comprise staggered slots connected by bridges of material. The rings are placed inside the hubs of the discs during welding; an axial force is applied on the rings, which tends to displace them radially via their internal conical portion, so that they come into contact with the internal surface of the hubs and so that they dampen the vibrations in the axial plane of these hubs. However, when the diameter of the hubs is substantial, the axial force applied on the rings is substantial. The rings are furthermore difficult to remove at the end of welding, and risk scratching the internal surface of the hubs.

Finally, the hubs of the discs generally present different inner diameters and uncontrolled coaxial misalignments, therefore random, which are intrinsic to the process of welding via friction and which can reach 0.3 mm, which renders the use of these rings very delicate.

It has also been proposed, in FR 2848132, a damper suited for reducing the vibrations of components during the welding by friction, comprising a generally annular body having a spiral-shaped slot formed within.

Moreover, in the field of pipelines, a set of mandrels has been proposed, each comprising internal and external jaws suited to engage with sections of pipe intended to form the pipeline. However, in order to guarantee a good maintaining of the sections of pipes during the welding by friction, the jaws deform them locally thanks to corresponding bosses. Such information cannot be applied to hubs of turbomachines, in particular of a compressor or of a turbine, in that the latter must under no circumstances be damaged during welding.

SUMMARY OF THE INVENTION

The invention has in particular for object to provide a simple, effective, ergonomic and economical solution to these problems.

More particularly, an objective of the invention is to propose a solution for welding by rotational friction discs, in particular of a compressor or of a turbine (high or low pressure), which is able to reduce and even prevent the vibrations in an plane axial to the discs, simply, effectively and economically, without the risk of damaging the internal surface of the hubs, despite any uncontrolled coaxial misalignments of these discs, and this regardless of the inner diameter or the difference between the inner diameters of the hubs of the discs.

For this, the invention proposes a vibration dampening device for the manufacture via rotational friction welding of a turbomachine rotor, said rotor comprising at least one first disc and a second disc extending coaxially along a main axis of the rotor, with the first disc and the second disc each comprising a hub having an internal surface, with the device comprising at least one first clamping device configured to be positioned coaxially to the hub of the first disc, comprising a pair of radially opposite jaws suited to come into contact with the internal surface of said hub, each jaw having a radially external surface configured to come into contact with the internal surface of a facing hub, said radially external surface being covered with a lining made of a material able to dampen vibrations.

Certain preferred but not restrictive characteristics of the dampening device according to the invention are the following:
- the rotor comprises at least one third disc, and the device comprises at least one second clamping device configured to be positioned coaxially and facing the hub of the second disc, with all of the clamping devices being independent from one another,
- each clamping device comprises an autonomous hydraulic block suited to radially displace its respective jaws between a rest position, wherein the jaws are retracted, and a clamping position, wherein the jaws are radially separated from their rest position in order to come to bear against the internal surface of the facing hub,
- the hydraulic block of each clamping device comprises a plunger-type cylinder suited for radially displacing the jaws from their rest position to their clamping position, and a return means suited to bring back the jaws from their clamping position to their rest position,
- the dampening device further comprises a rod passing through all of the clamping devices in order to position the clamping devices in relation to one another,
- the dampening device further comprises a support suited to receive the hubs of the discs and position the clamping jaws in relation to said hubs,
- the dampening device further comprises at least one spacer suited to axially position the first clamping device on the vibration dampening device along the main axis, and the linings are made from a viscoelastic elastomer material.

According to a second aspect, the invention further relates to a method for manufacturing a turbomachine rotor, said rotor comprising at least one first disc and a second disc extending coaxially along a main axis of the rotor and each comprising a hub that has an internal surface, with the method comprising the following steps:

positioning the hub of the first disc on a vibration dampening device as described hereinabove, positioning the first clamping device on the dampening device, placing the jaws of the first clamping device engaged with the internal surface of the hub of the first disc, and welding the second disc onto the first disc via rotational friction.

A preferred but not restrictive characteristic of the method of manufacture is the following: the compressor comprises at least one third disc comprising a hub, and the method further comprises the following steps:

positioning a second clamping device of the vibration dampening device coaxially to the first clamping device, positioning the hubs of the first and second discs on the first clamping device and the second clamping device respectively, applying the jaws of the first clamping device against the internal surface of the hub of the first disc, and the jaws of the second clamping device against the internal surface of the hub of the second disc, in such a way as to dampen the vibrations generated by the step of welding.

BRIEF DESCRIPTION OF THE DRAWINGS

Other characteristics, purposes and advantages of this invention shall appear better when reading the following detailed description, and with regards to the annexed drawings provided by way of non-restricted examples and wherein.

DETAILED DESCRIPTION OF AN EMBODIMENT

In what follows, the invention shall be described more particularly in the framework of the assembling of the discs $2a$-$2e$ (or compression stages) of a compressor, in particular high pressure. This is not however a limitation, in that the invention applies mutatis mutandis to the assembly of expansion stages of a turbine.

The compressor comprises several discs 2 (or compression stages), here five discs $2a$-$2e$, each comprising a disc that can be vaned, mobile in rotation around its main axis X, and a fixed impeller. The discs are either provided with peripheral grooves wherein vanes are nested, or with integrally vaned discs.

The discs $2a$-$2e$ include hubs $3a$-$3e$ of a generally cylindrical revolution shape and extend coaxially to an axis of rotation X of the compressor. Each hub $3a$-$3e$ comprises an internal surface $4a$-$4e$ (or bore) and an external surface from which the vanes radially extend.

The vibration dampening device 1 has a main direction extending along a longitudinal axis Y, more preferably coaxial to the main axis X of the compressor. The dampening device 1 comprises at least one clamping device $10a$, and more preferably as many clamping devices $10a$-$10d$ as there are hubs $3a$-$3d$ to dampen, aligned along the axis Y of the vibration dampening device 1. Each clamping device $10a$-$10d$ is suited to be introduced into the hubs $3a$-$3d$, and maintained in this position during successive steps of welding.

Preferably, to each hub $3a$-$3d$ corresponds a suited clamping device $10a$-$10d$, keeping in mind that only the hubs $3a$-$3d$ fixed in rotation at the time of the step of welding are dampened in vibrations by the dampening device 1. As we shall see in what follows, as the hubs $3a$-$3e$ are welded together one after the other, the clamping device $10b$-$10d$ corresponding to the previously welded hub $3b$-$3d$ is therefore added in the dampening device 1, as there is progression in the method of manufacture.

Each clamping device $10a$-$10d$ comprises means $11a$-$11d$ configured to come in contact with the internal surface $4a$-$4d$ of a facing hub $3a$-$3d$ in order to dampen the vibrations caused by the welding by rotational friction of the different discs $2a$-$2e$ together by preventing the low axial deflection at high frequencies resulting from the vibrations. These means can in particular be two radially opposite jaws $11a$-$11d$, of which the external radial wall is of a generally complementary shape with the portion of inner wall $4a$-$4d$ facing the hub $3a$-$3d$. The jaws $11a$-$11d$ are therefore of generally cylindrical shape. Preferably, the jaws $11a$-$11d$ are furthermore flexible in a radial plane in order to hug the internal surface $4a$-$4d$ of the hubs $3a$-$3d$, and rigid in a longitudinal plane in order to guarantee in particular the longitudinal rigidity of the hub $3a$-$3d$ during welding. The flexibility in the radial plane of the jaws $11a$-$11d$ makes it possible to clamp several hubs $3a$-$3d$ with the same intensity by overcoming any uncontrolled coaxial misalignments, and therefore random, of the hubs $3a$-$3d$.

For example, the jaws $11a$-$11d$ can be made of steel or of aluminium, and have a length between about a quarter and half of the inner circumference of the hub $3a$-$3d$, more preferably of a magnitude of a third of the inner diameter, a width less than or equal to the width of said hub $3a$-$3d$ and a thickness of a magnitude of two millimetres.

The external radial wall of the jaws $11a$-$11d$ can furthermore be covered with a lining 12, adapted for limiting the risks of damaging the internal surface $4a$-$4d$ of the hubs $3a$-$3d$ by the jaws $11a$-$11d$, while still guaranteeing good contact with the latter in order to dampen their axial vibration offsets. For example, the lining 12 can be made from a viscoelastic material that has good dampening properties in shearing displacement, such as certain polyurethanes. As such, the risks of scratching the hubs 3a-3d to be dampened can be reduced and even eliminated, while still improving the axial and radial dampening of the vibration dampening device 1.

Each clamping device 10a-10d further comprises an actuating member 13a-13d of the jaws 11a-11d, suited to radially displace its respective jaws 11a-11d between a rest position, wherein the jaws 11a-11d are retracted in order to allow in particular for the insertion of the clamping device 10a-10d into the corresponding hub 3a-3d, and a clamping position, wherein the jaws 11a-11d are radially separated from the rest position in order to come to bear against the internal surface 4a-4d of the facing 3a-3d. This actuating member 13a-13d can in particular include a hydraulic cylinder actuated by a hydraulic system of a hydraulic block, comprising for example a plunger-type cylinder. The actuating of the plunger then makes it possible to radially displace the jaws 11a-11d from their rest position to their clamping position.

The plunger can in particular be actuated in rotation using a torque wrench.

The jaws 11a-11d can then be brought back to their rest position using a suitable recalling member 14a-14d, for example a spring. Note that the jaws are fixed in rotation in relation to dampening device 1 and to the hubs 3a-3e, and can where applicable be mobile in translation along the axis Y.

The radial offset of the jaws 11a-11d between the rest position and the clamping position can be between two millimetres and thirty millimetres, for example of a magnitude of five millimetres, so as to allow for the extraction of the clamping device 10a-10d after the welding of the last disc 2b-2e added, even if its inner diameter is less than that of the hub 3a-3d (respectively) dampened by the corresponding clamping device 10a-10d.

According to an embodiment, each clamping device 10a-10d comprises its own hydraulic block 13a. The clamping devices 10a-10d are therefore all autonomous and independent. As such, it is for example possible to rapidly, simply and where applicable automatically re-establish the hydraulic pressure to its initial level for each of the clamping devices 10a-10d after each use.

The jaws 11a-11d of the clamping devices 10a-10d can be engaged successively against the internal surface 4a-4d of the corresponding hubs 3a-3d, through successive actuating of the actuating members 14a-14d. The hydraulic blocks 13a-13d are then actuated from the last clamping device to the first clamping device, i.e. first the clamping device of the fixed hub which is just about to be welded is actuated, then the adjacent clamping device, and so on until the first clamping device 10a.

For this, the clamping devices 10b-10d include for example through-holes 15a-15c allowing for the passage of a suitable wrench for actuating the actuating members 13a-13c of the clamping devices 10a-10c that are already arranged on the dampening device 1. For example, the clamping device 10c comprises its actuating member 13c, a first through-hole 15b making it possible to access with a wrench the actuating member 13b of the adjacent clamping device 10b, and a second through-hole 15a making it possible to access the actuating member 13a of the clamping device 10a through the clamping device 10b.

Figure 1:
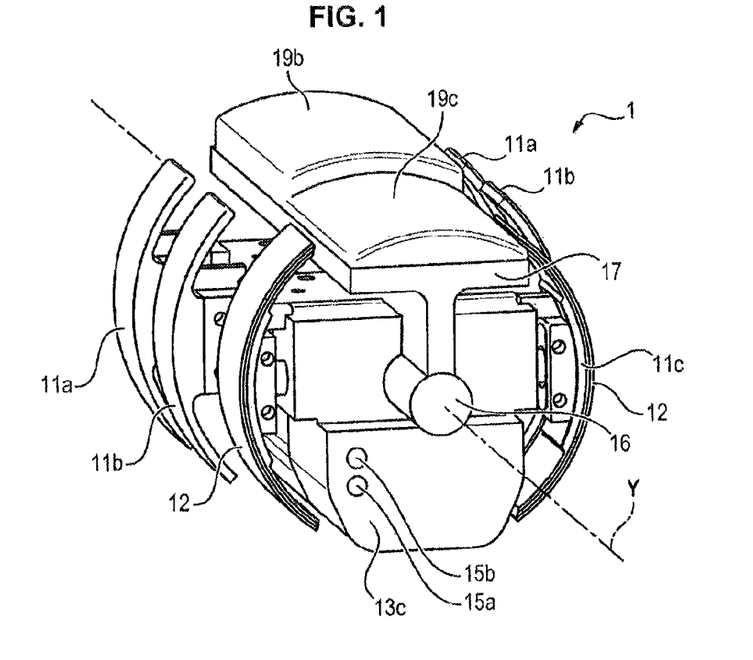
FIG. 1 is a perspective view of an example embodiment of a vibration dampening device in accordance with the invention.
Figure 2:
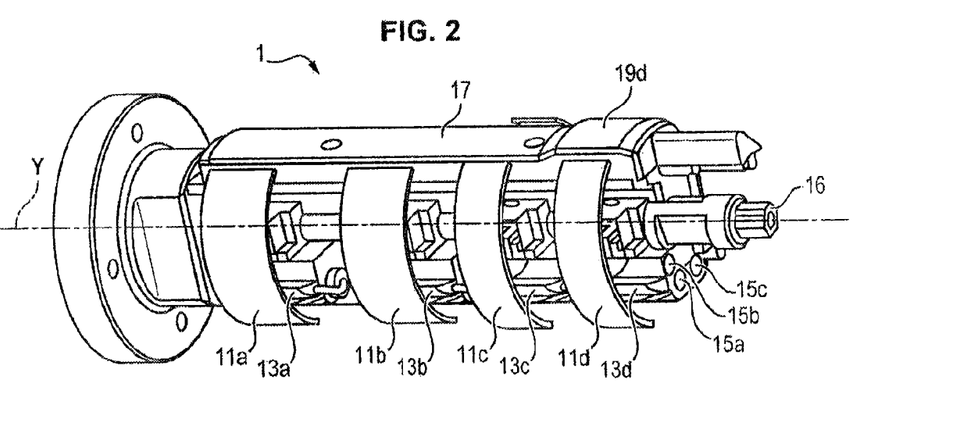
FIG. 2 is a perspective view of an example embodiment of a vibration dampening device in accordance with the invention.
Figure 3:
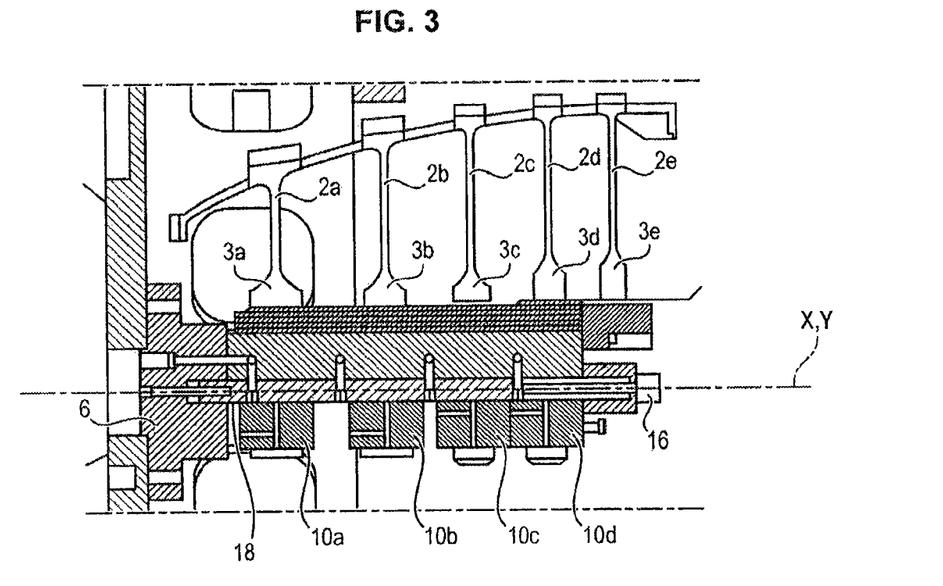
FIG. 3 is a cross-section view of an example embodiment of FIG. 2 in use, wherein has been diagrammed compression stages of an example of a compressor that can be obtained using the method of manufacture of the invention.
Figure 4:
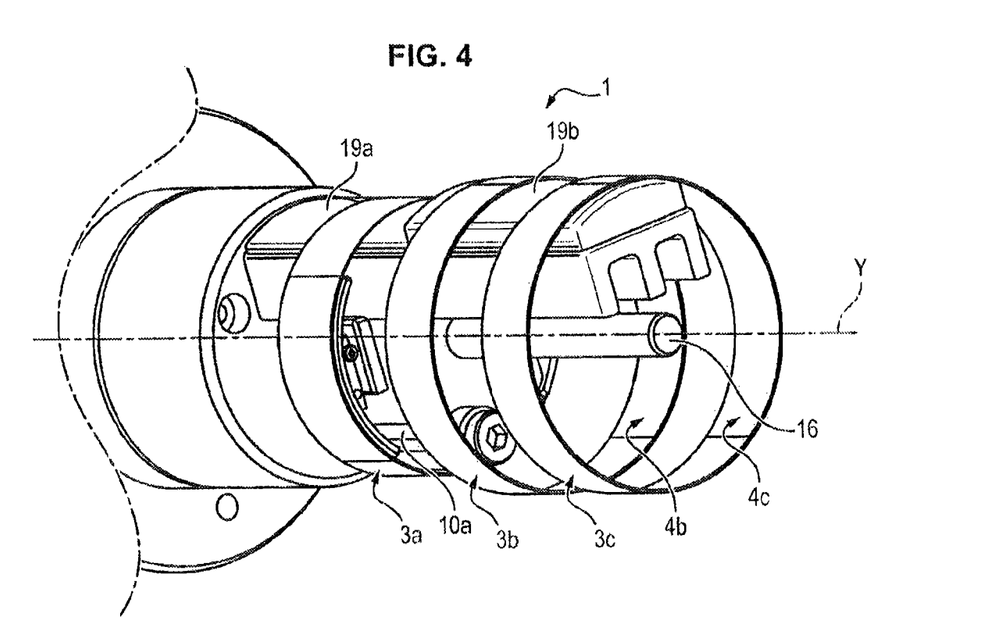
FIG. 4 is a partial perspective view of an example of a vibration dampening device in accordance with the invention, wherein a single clamping device is shown and hubs of compression stages have been diagrammed.

As shown in FIG. 3, the vibration dampening device 1 can further comprise means suited for axially positioning the clamping devices 10a-10d in relation to one another and in relation to the hubs 3a-3d.

For this, the vibration dampening device 1 can include in particular a rod 16, which can be of cylindrical shape, whereon the clamping devices 10a-10d can be threaded successively. Preferably, the clamping devices 10a-10d are slidingly mounted on the rod 16 in order to be able to be displaced along the latter.

Here, the rod 16 extends along the axis Y of the vibration dampening device, and therefore coaxially to the axis of rotation X of the hubs 3a-3d. In this way, the rod 16 makes it possible to centre the clamping devices 10a-10d in relation to the axis of rotation X of the hubs 3a-3d.

Figure 5:
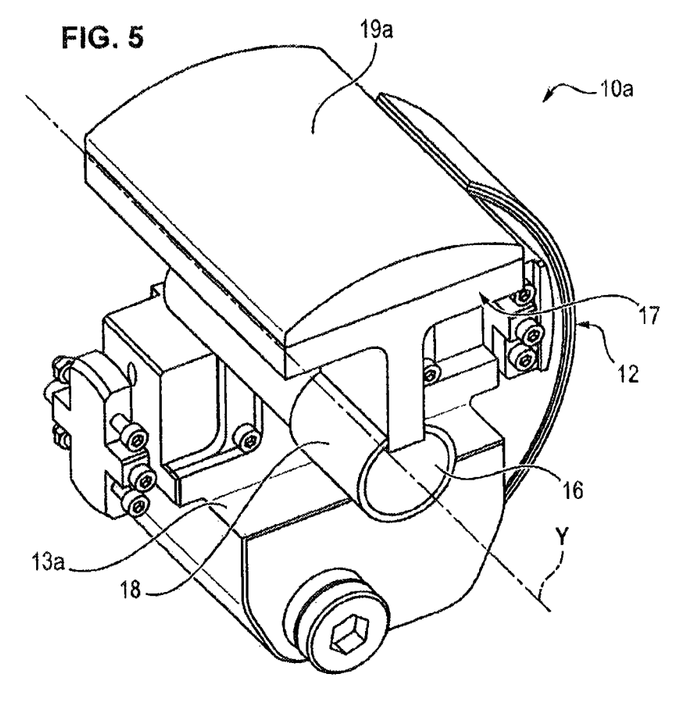
FIG. 5 is a partial view of an example of a clamping device that can be used in a dampening device for vibrations in accordance with the invention.
Figure 6:
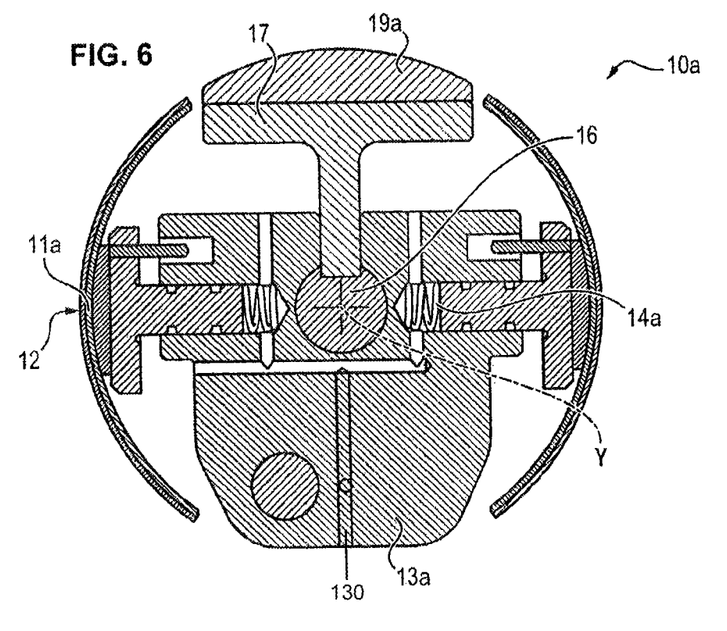
FIG. 6 is a transversal cross-section view of an example of a clamping device of a vibration dampening device.

As shown in FIGS. 5 and 6, the vibration dampening device 1 can further comprise means 17 suited for receiving the hubs 3a-3d in order to position them correctly in relation to the clamping devices 10a-10d. This can be for example a support 17, extending along the rod 16, configured to support all of the hubs 3a-3d fixed in rotation during welding. Alternatively, it can also be several separated supports, connected together via the rod 16.

The support 17 can be formed integrally with the rod 16 or added and fixed onto the latter.

The jaws 11a-11d then extend on either side of the support 17.

As can be seen in the figures, the support 17 is for example a T beam fixed onto the rod 16, provided with pads 19a-19d with shaped that are generally complementary with the internal surface 4a-4d of the hubs 3a-3d in order to be able to support them during welding. The pads 19a-19d can be displaced along the support 17 in order to follow the hubs 3a-3d during the method of welding. They can for example be made from a plastic material, for example polyethylene or nylon.

In order to improve the relative positioning of the clamping devices 10a-10d on the rod 16, the vibration dampening device 1 can further comprise spacers 18 suited to axially position them along the rod 16. The spacers 18 can in particular be mounted on the rod 16, which is furthermore used to guide it. For example, each spacer 18 can have the shape of a slotted tube of determined length, able to be fitted onto the rod 16.

The clamping devices 10a-10d, and where applicable the spacers 18, can then be blocked in axial position by simple screwing of a screw on one end of the rod 16.

As such, the clamping devices 10a-10d are precisely positioned in the space using the rod 16, and in relation to one another using spacers 18. The hubs 3a-3d are precisely positioned in relation to one another using the support 17 and clamping devices 10a-10d.

Figure 7:
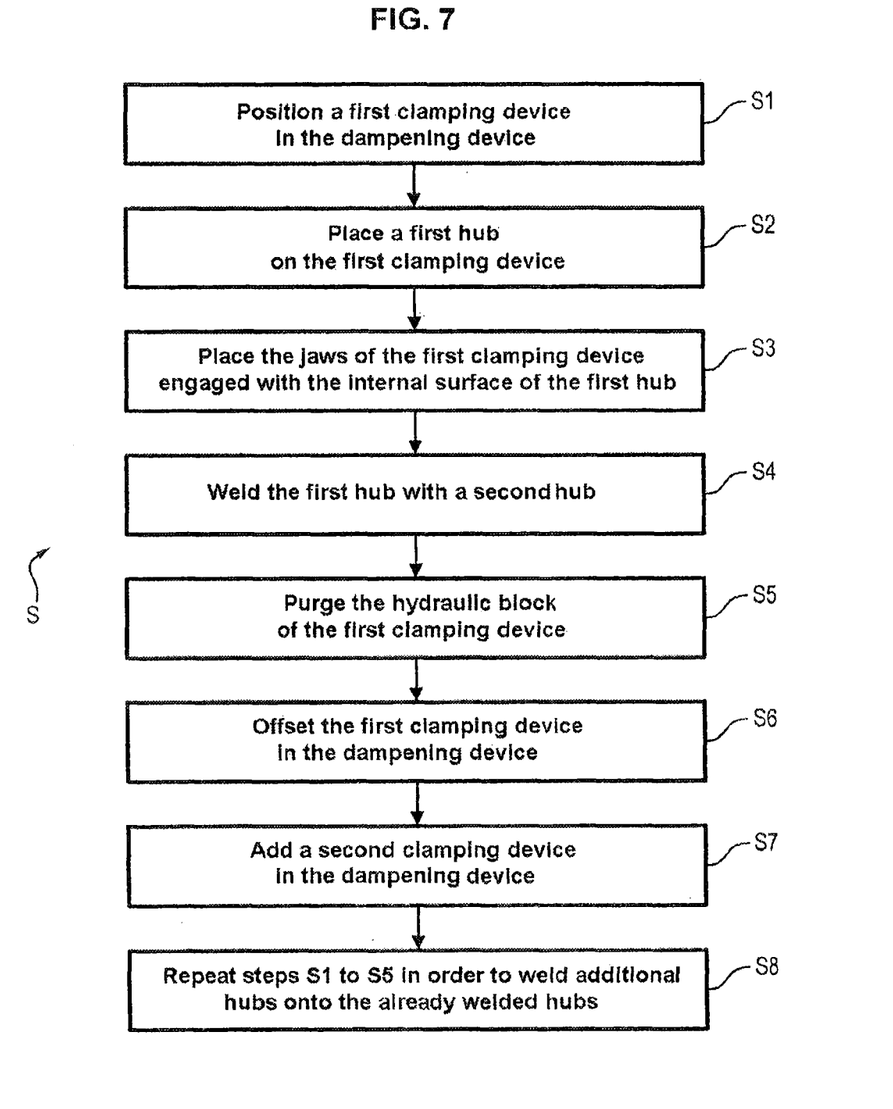
FIG. 7 shows different steps of an example embodiment of the method of manufacture in accordance with the invention.

An assembly method S of the discs 2a-2e of a turbomachine rotor, for example of a compressor, shall now be described in reference to FIG. 7.

In this example, the compressor comprises five discs 2a-2e to be assembled in turn by rotational friction welding (inertial or pilot). This is not however a limitation, in that the method can be applied to the assembling of a different number of discs or to the assembling of discs of a turbine.

During a first step S1, the hub 3a of the disc that is desired to be welded is positioned on the dampening device 1, for example on the support 17.

During a second step, a first clamping device 10a is positioned on the vibration dampening device 1. For this, the first clamping device 10a is threaded onto the rod 16, in such a way that the jaws 11a of the first clamping device 10a are located across from the internal surface 4a of the hub 3a. In order to facilitate the placing of the first clamping device 10a in relation to the internal surface 4a of the hub 3a, the jaws are more preferably in rest position (i.e. in retracted position).

The first clamping device 10a can in particular be positioned axially in relation to the rod 16 using a suitable spacer 18. For this, the spacer 18 is fixed onto the rod 16, then the first clamping device 10a is brought to abutment against the spacer 18. The first clamping device 10a can then be fixed in this position via (where applicable) the spacer 18 and the end screw of the rod 16.

Optionally, the discs 2a-2e can be fixed from the smallest 2a (in diameter) to the largest 2e. The hub 3a of the first disc 2a (called the first hub 2a) is consequently positioned first on the first clamping device 10a, in order to weld it to the hub 3b of the second disc 2b (called the second hub 3b).

During a third step S3, the jaws 11a are then separated towards their clamping position by the actuating of the plunger by the hydraulic block 13a of the first clamping device 10a. The first hub 3a is then maintained in position by the jaws 11a of the first clamping device 10a.

During a fourth step S4, the first disc 2a is welded by resistance by rotational friction onto the second disc 2b. For this, and conventionally, the second disc 2b is placed into rotation in relation to the first disc 3a, which remains fixed, then the first disc 2a is strongly pushed according to the axis X against the second disc 2b, which rotates around the axis X and which is fixed in translation. The friction of the surfaces of the discs 2a and 2b in contact releases a large quantity of heat which raises the temperature of these surfaces in contact and allows them to be assembled via welding.

The first disc 2a and the second disc 2b are then welded together.

The jaws 11a can then be unclamped in order to remove the first clamping device 10a. Optionally, the unit formed by the discs 2a and 2b can then be removed and where applicable the spacer of the support 17 in order to be able to carry out the intermediate steps in the welding, of which in particular purging the hydraulic block 13a of the first clamping device 10a (step S5), in order to prevent the formation of air bubbles. This purging is facilitated by the fact that each clamping device 10a-10d comprises its own hydraulic block 13a-13d and is autonomous.

In order to weld the hub 3c corresponding to the following disc 2c (third disc 2c), it then suffices to add a second clamping device 10b on the vibration dampening device 1, in order to also dampen the vibrations that the second hub 3b is subjected to (of which the disc 3b is already fixed to the first disc 3a), then to weld the disc 2c, by repeating steps S1 à S5.

For this, the spacer 18 (step S6) can in particular be changed, in order to offset the first clamping device 10a and leave room for the second clamping device 10b (step S7) in the vibration dampening device 1. The method can then be reiterated, by positioning (step S7) the second clamping device 10b on the vibration dampening device 1, then by placing the first hub 3a and the second hub 3b (of which the discs 2a and 2b are welded together) on their respective clamping device 10a, 10b (step S8). The hubs 3a and 3b are then maintained in this position by actuating their respective jaws 11a, 11b (step S9) so that they come into contact with the internal surface 4a, 4b of the corresponding hub 3a, 3b. The third disc 2c can then be welded onto the second disc 2b as indicated hereinabove, with the vibration dampening device 1 dampening the vibrations received by the first hub 3a and the second hub 3b.

According to an embodiment, the hydraulic block 13b of the second clamping device 10b is actuated first, then the hydraulic block of the first clamping device 10a, using their respective actuating member 13a, 13b. The set of hubs 3a and 3b already welded if then clamped by their corresponding clamping devices 10a, 10b.

The method S can then be repeated as many times as necessary in order to weld together the hubs 3a-3e of all of the discs 2a-2e, by changing where applicable the spacer 18 at each new hub 3a-3e in order to be able to axially offset the clamping devices 10a-10c and allow for the insertion and the positioning of an additional clamping device 10b-10d, then by placing each clamping device 10a-10d into engagement with the hub 3a-3d that corresponds to it prior to the step S4 of welding via rotational friction properly speaking.

It is understood that this method S has the advantage of being able to adapt each clamping device 10a-10d independently to the corresponding hub 3a-3d, and to be able as such tighten with the same intensity hubs 3a-3d with possibly different inner diameters and which can have coaxial misalignments that can reach 0.3 millimetres.

This coaxial misalignment is furthermore offset by the flexibility in the single radial plane of the jaws 11a-11d.

Moreover, at each new weld (for the adding of an additional hub 3b-3e to the set of hubs 3a-3d already welded), the clamping devices 10a-10c are displaced in the vibration dampening device 1, which ensures that the same clamping device 10a-10d is used for a given hub 3a-3d.

Finally, implementing such a vibration dampening device 1 makes it possible to simultaneously dampen a plurality of hubs 3a-3d, for example four or five hubs 3a-3e, during a method of rotational, inertial or pilot friction welding, which was not able to be carried out reliably, simply and rapidly with known devices.

In addition, thanks to the radial offset of the jaws 11a-11d, it is possible to extract the clamping devices 10a-10d from the discs 2a-2d already welded, without difficulty, by bringing the jaws 11a-11d back into their rest position. Intermediate operations can therefore be carried out on the clamping devices 10a-10d and the hubs 3a-3d already welded. This extraction is all the more so simple in that the clamping devices 10a-10d have an independent hydraulic block 13a-13e.

The invention claimed is:

1. A vibration dampening device for manufacturing a turbomachine rotor by rotational friction welding, said rotor comprising a first disc and a second disc extending coaxially along a main axis of the rotor, each disc comprising a hub having an internal surface, the device comprising:

a first clamping device configured to be positioned coaxially to the hub of the first disc and including a pair of radially opposite jaws suited to come into contact with the internal surface of said hub of the first disc, a hydraulic block which radially displaces each of the jaws between a rest position, in which the jaws are retracted, and a clamping position, in which the jaws are extended radially from the rest position in order to come to bear against the internal surface of the hub, a rod extending along an axis of the vibration dampening device, and a support connected to the rod and extending radially from the rod, the support being stationary and provided with a pad with a shape complementary to the internal surface of the hub, wherein each of the jaws has a radially external surface configured to come into contact with the internal surface of the hub, said radially external surface being covered with a lining made from a material able to dampen vibrations, wherein the jaws have a length of a magnitude of about a third of an inner diameter of the hub and a thickness of a magnitude of about two millimeters, wherein the radially external surface of the jaws and an outer surface of the pad are circumferentially concentric about the axis of the vibration dampening device, wherein, the jaws are disposed on lateral sides of the support, and wherein circumferential spaces are provided between the jaws and the support.

2. The vibration dampening device according to claim 1, wherein the rotor comprises a third disc, wherein the device comprises a second clamping device configured to be positioned coaxially with the first clamping device and facing the hub of the second disc, and wherein all of the clamping devices are independent from one another.

3. The vibration dampening device according to claim 2, wherein the rod passes through all of the first and second clamping devices in order to position the first and second clamping devices in relation to one another.

4. The vibration dampening device according to claim 1, further comprising a spacer which axially positions the first clamping device on the vibration dampening device along the main axis.

5. The vibration dampening device according to claim 1, wherein the lining is made from a viscoelastic elastomer material.

6. The vibration dampening device according to claim 1, wherein the jaws are made of steel or aluminum.

7. The vibration dampening device according to claim 1, wherein a width of the jaws is less than or equal to a width of the hub of the first disc.

8. The vibration dampening device according to claim 1, wherein the support is disposed above the hydraulic block, and the jaws are disposed laterally of the hydraulic block.

9. A method of manufacture for a turbomachine rotor, said rotor comprising a first disc and a second disc extending coaxially along a main axis of the rotor and each disc comprising a hub having an internal surface, the method comprising:

providing a vibration dampening device according to claim 1;

positioning the hub of the first disc on the first clamping device of the vibration dampening device;

placing the jaws of the first clamping device in the clamping position such that the jaws of the first clamping device are engaged with the internal surface of the hub of the first disc; and welding the second disc onto the first disc by rotational friction.

10. The method of manufacture according to claim 9, wherein the rotor comprises a third disc comprising a hub, and the method further comprises:

positioning a second clamping device of the vibration dampening device coaxially to the first clamping device, the second clamping device including jaws which bear against the internal surface of the hub of the second disc;

positioning the hubs of the first and second discs on the first clamping device and the second clamping device respectively;

placing the jaws of the first clamping device against the internal surface of the hub of the first disc, and placing the jaws of the second clamping device against the internal surface of the hub of the second disc; and welding the third disc onto the second disc by rotational friction.

* * * * *

UNITED STATES PATENT AND TRADEMARK OFFICE
CERTIFICATE OF CORRECTION

PATENT NO. : 9,707,640 B2  
APPLICATION NO. : 14/098721  
DATED : July 18, 2017  
INVENTOR(S) : Jean-Luc Bour Page 1 of 1

It is certified that error appears in the above-identified patent and that said Letters Patent is hereby corrected as shown below:

In the Specification

Column 4, Line 54, change "jaws 11a-11dcan" to --jaws 11a-11d can--;

Column 4, Line 60, change "jaws 11a-11dcan" to --jaws 11a-11d can--;

Column 4, Line 63, change "3a-3dby the jaws" to --3a-3d by the jaws--; and

Column 5, Line 1, change "hubs 3a-3dto be" to --hubs 3a-3d to be--.

Signed and Sealed this  
Twenty-eighth Day of May, 2019

Andrei Iancu  
*Director of the United States Patent and Trademark Office*